Aug. 16, 1949. F. A. HOWARD 2,479,360
PROCESS FOR POLYMERIZING HYDROCARBONS
Filed Dec. 9, 1943 3 Sheets-Sheet 2

Frank A. Howard Inventor
By [signature] Attorney

Patented Aug. 16, 1949

2,479,360

UNITED STATES PATENT OFFICE 2,479,360

PROCESS FOR POLYMERIZING HYDROCARBONS

Frank A. Howard, Elizabeth, N. J., assignor to Standard Oil Development Company, a corporation of Delaware Application December 9, 1943, Serial No. 513,562

6 Claims. (Cl. 260—85.3)

This invention relates to processes and apparatus for the low temperature polymerization of olefinic substances, and more particularly it relates to a method and apparatus for continuous production of high molecular weight polymers by the co-polymerization of iso-olefins and diolefins.

It is the object of this invention to provide the art with a method and apparatus whereby low temperature co-polymerization of mixtures of iso-olefins and diolefins may be conducted in a continuous and highly efficient manner.

It is a further object of this invention to provide the art with a method and apparatus whereby high molecular polymers obtained by the co-polymerization of a mixture of an iso-olefin and diolefin at low temperatures in the presence of Friedel-Crafts type catalysts may be produced easily and with more uniform properties.

These and other objects will appear more clearly from the detailed description and claims which follow.

Low molecular weight olefins, such as isobutylene, react with low molecular weight diolefins, such as butadiene, isoprene, or dimethyl-butadiene, at relatively low temperatures, e. g. below 0° C., and preferably below —50° C. and even as low as —160° C. or lower, in the presence of a catalyst such as aluminum chloride dissolved in a non-complex-forming low alkyl halide, such as methyl or ethyl chloride, to produce a polymer having low, controlled chemical unsaturation and capable of being cured with sulfur. Various low boiling liquids, such as liquid propane, liquid ethylene and liquid ethane may be used as refrigerants to secure the desired low temperature. The polymerization reaction may be conducted as a batch operation but great difficulty is encountered in recovering the various refrigerants, diluents and unpolymerized reactants since most of these substances are gases at room temperature and even at temperatures only slightly above the reaction temperature used.

These characteristics of the substances making up the reaction mixture, together with the solid character of the final product, makes it exceedingly difficult to separate the polymerized product from the reaction mixture without the loss of undesirably large portions of the gaseous diluent and unpolymerized reactants and the development of a serious fire hazard and industrial poisoning hazard which would otherwise arise when substantial quantities of gaseous hydrocarbons are set free in a room.

Such polymerizations may be conducted either in the presence of an internal refrigerant, or with the use of an external refrigerant in a jacket surrounding the reactor. There are certain advantages to be gained in conducting the reaction in the presence of other diluents than the liquid refrigerant, which diluents have a higher boiling point than ethylene, usually used as the refrigerant, and are incapable of serving as internal refrigerants. In such cases it is necessary to provide some other cooling agent and to remove the heat of reaction by indirect cooling. By such means it is possible to keep the refrigerant uncontaminated with other materials, thus eliminating the necessity of repurifying the refrigerant. This method of operation also permits a greater choice of materials for use as diluent in the reaction and particularly permits the use of isobutylene itself as the principal diluent.

The reaction may be carried out in such a way as to keep the solid polymer in finely divided condition suspended in the cold reaction mixture so that a slurry of solid polymer in the cold reaction mixture is obtained which can be handled at low temperature in pumps and pipes and which can then be dropped into well agitated warm water or other liquid whereby the volatile materials are effectively removed as vapors, leaving the polymer in the water as a finely divided slurry. The dried polymer is, in general, used directly, although in most cases where the product must be shipped it is desirable to mill or extrude the product to increase bulk density and to facilitate packaging.

Stable slurries of polybutenes can be produced at —130° F. using methyl-chloride-isobutylene feeds by maintaining a volume ratio of methyl chloride to isobutylene over about 0.7:1 in the reaction mixture, with good agitation throughout the slurry. At higher temperatures, higher diluent ratios are required, and above about —60° F. a slurry cannot be formed in any case, as the molecular weight of the polymer is much lowered by the increase in reaction temperature level. This temperature effect on the molecular weight has been described by Thomas, Sparks, Frolich, Otto and Muller Cunradi in the Journal of the American Chemical Society, vol. 62, p. 276 (1940). Ordinarily, those conditions which lead to the formation of polybutenes of medium or high molecular weight, i. e. of 80,000 and higher, yield polymers in the form of a stable, filterable slurry.

The same general principles apply to the co-polymerization of isobutylene with a diolefin to form butyl rubber. The molecular weights of butyl rubber are considerably lower than those of polybutene prepared under otherwise similar conditions, due to the presence of the diolefin. At —130° F., diluent ratios above 1:1 in the reaction zone should obtain, and preferably these ratios should be over 2:1. The reaction temperature should not exceed about —90° F., and the concentration of aluminum chloride, when using aluminum chloride-methyl chloride catalyst, should preferably be not over about 1 gram per 100 cc. Such polymers having a Staudinger molecular weight of about 30,000 and above can easily be maintained as a slurry provided the per cent hydrocarbon or other mutual solvent is not too high. Thus, when the reaction liquid contains 60 to 90 weight per cent of methyl chloride, the slurries containing polymer averaging over roughly 30,000 molecular weight are quite stable, but if the percentage of methyl chloride is reduced to about 30% the slurry becomes unstable and the polymer particles tend to agglomerate.

With increasing diolefin content of the butyl rubber feed, the molecular weight is lowered, and the temperature at which a slurry is stable is lowered. Increasing diluent ratio will also compensate for lower molecular weight of polymer and permit slurry formation.

In preparing isoolefin-diolefin copolymers, it has been found that 10 to 20 weight per cent of solids is the maximum desirable operating range, with about 20 to 30 weight per cent of solids the maximum operable concentration. In general, the lower the weight per cent solids, the easier it is to maintain the slurry.

The present invention provides a new type of reactor for forming a slurry of the polymer in a diluent, with means for separating and recovering the solid polymer formed and the volatilized gaseous portions of the reactant mixture.

Broadly, the apparatus of the present invention comprises a reaction vessel, such as a ball mill, in combination with means for separating the polymer from the liquid reactants and diluents in which the reaction vessel contains solid balls or pieces of inert material which will cause the polymer to be broken up and macerated as the reactor is rotated. The apparatus is tightly closed with solid covers and is supplied with two pipe lines for the delivery of the various component parts of the reaction mixture to the reactor, and further with discharge lines for the transfer of polymer to the separating equipment for removing the excess liquid reactants and diluents from the polymer.

Figure 1:
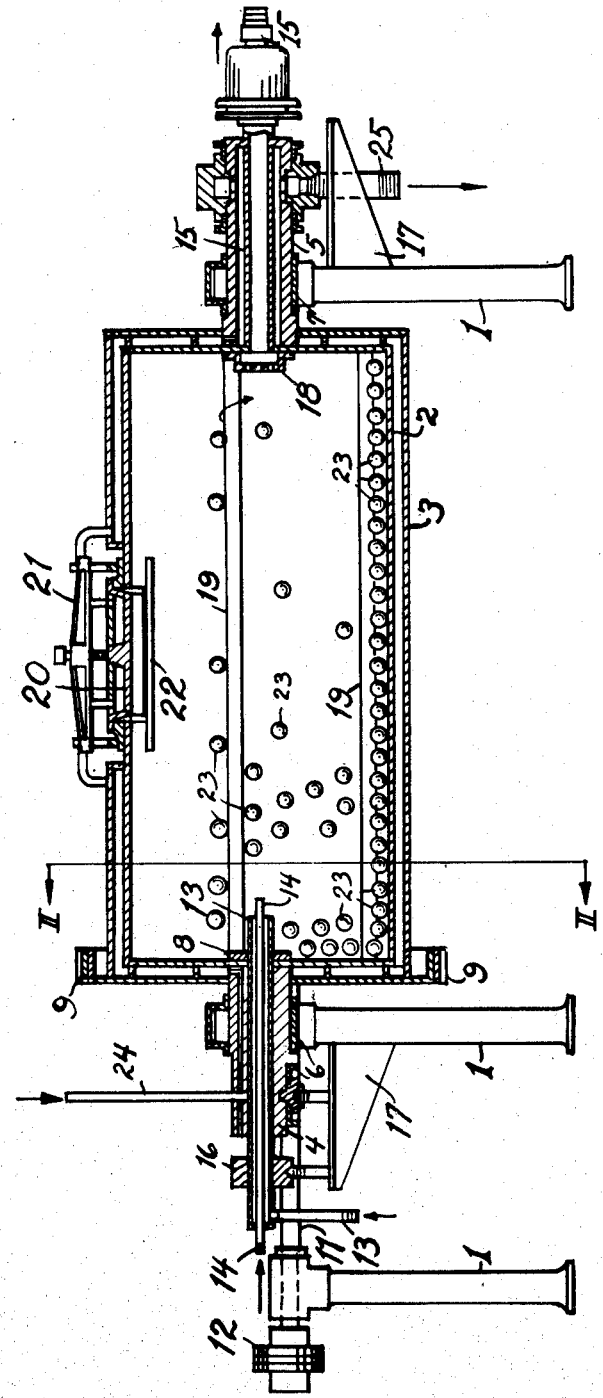
Figure 1 is a side view in elevation of the polymerization reactor according to this invention.
Figure 2:
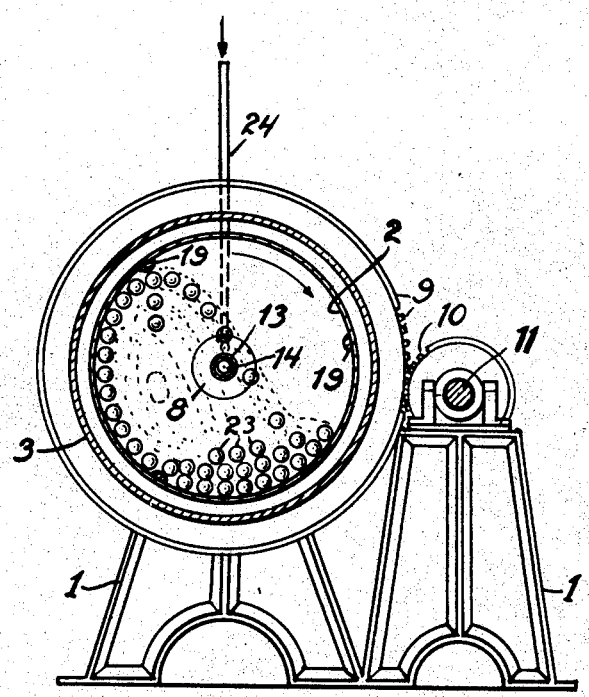
Figure 2 is a cross sectional view of the reactor taken along line 2—2 of Figure 1.

Referring in particular to Figures 1 and 2, 1 is a stand upon which a chamber 2 having an outer jacket 3 is mounted on trunnions 4 and 5 operating in bearings 6 and 7 respectively. This chamber is provided at one end with gear 9 which engages spur gear 10 attached through shaft 11 and flexible coupling 12 to a source of power (not shown). Inlet pipes 13 and 14 are provided in trunnion 4 and exit pipe 15 in trunnion 5. Inlet pipes 13 and 14 are immovably supported to stand 1 by means of clamp 16 and supporting bracket 17. Exit pipe 15 is provided with a perforated grid 18.

Access to chamber 2 is had by means of door 20 provided with clamp 21. Within and along the walls of chamber 2 are placed bars 19. Depending inside chamber 2 from door 20 is another bar 22. Chamber 2 is partially filled with pieces of loose inert material, such as steel or porcelain balls 23. Jacket 3 of chamber 2 is provided with inlet 24 and outlet 25.

Figure 3:
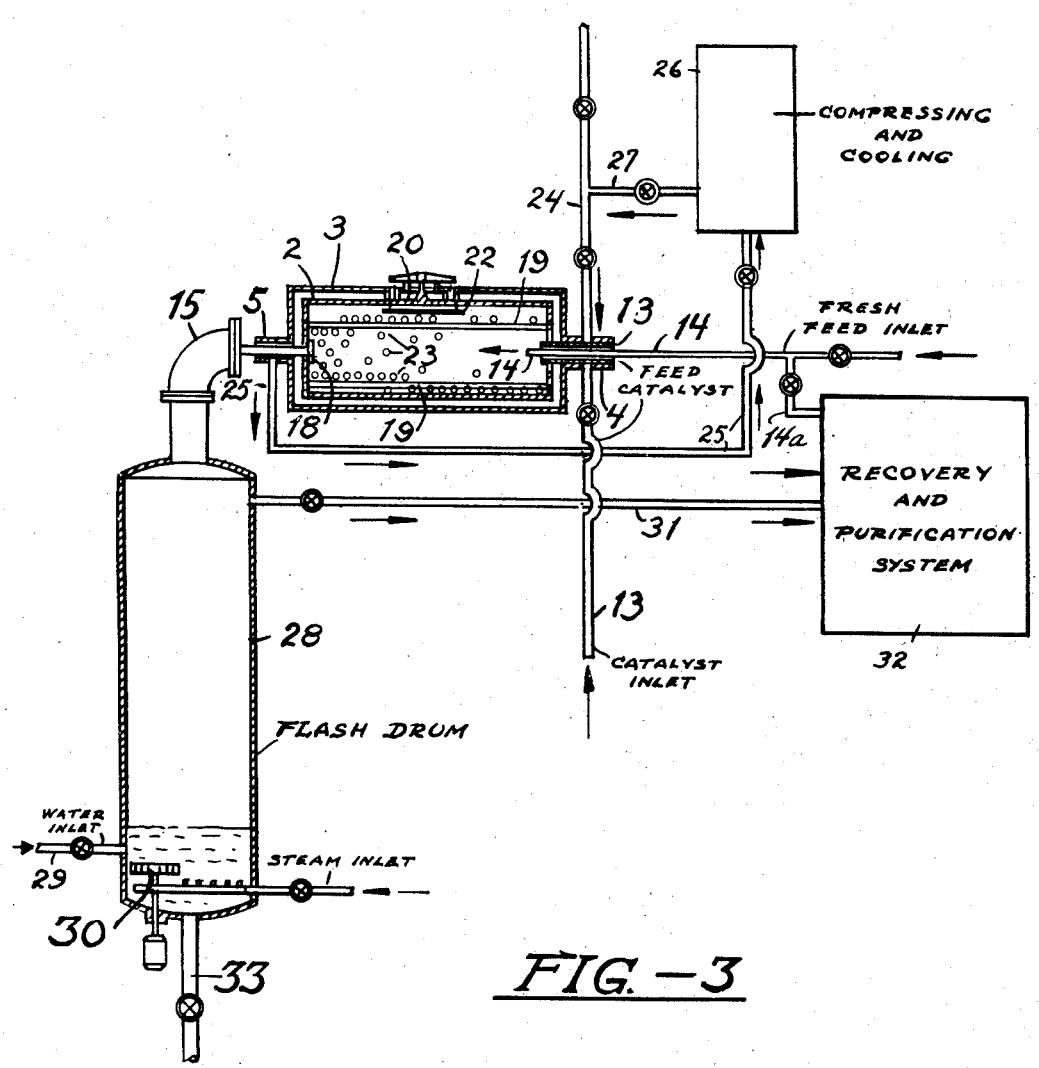
Figure 3 is a diagrammatic view of a continuous polymerization unit utilizing the reactor of the present invention.

Referring to Figure 3, the apparatus includes the ball mill reactor 2 filled to about one-third its capacity with steel or porcelain balls 23 into which is fed a precooled mixture of fresh feed composed of isobutylene and isoprene through line 14. A liquid refrigerant, such as liquid ethylene, is introduced into jacket 3 of chamber 2 by means of line 24 and vaporized refrigerant is removed through line 25. Line 25 is connected to a compressing and cooling system 26 wherein the refrigerant is reliquefied and returned through line 24. A catalyst solution comprising aluminum chloride dissolved in methyl chloride is supplied to the reactor through line 13 from which it is sprayed in a fine stream so as to thoroughly mix with the reactants issuing from inlet pipe 14 and to obtain satisfactory dispersion of the catalyst throughout the reaction mixture. Simultaneously with the introduction of the catalyst, the reaction vessel 2 is rotated in bearings 6 and 7 whereby the balls 23 are thrown violently about causing intimate mixing of the reactants, diluent and catalyst. The chamber 2 is preferably rotated at a speed of about 50 R. P. M. The reaction is almost instantaneous, fine particles of polymer which remain suspended in the unreacted liquid materials and diluent being formed by the action of the balls. The action of the balls is accentuated by the bars 19 and 22 which collect the balls near the bottom of the reactor and lift them to a point near the top from which they are thrown through the polymer mixture thereby pulverizing it and forming a slurry of small granules of polymer in the diluent liquid. The reactants are supplied to the reactor in such amounts that there are present therein about 90 to 99.5% of iso-olefin, preferably isobutylene, and about 10 to 0.5% of isoprene. The catalyst solution is about 0.1 to 1.0% solution of aluminum chloride in methyl chloride or ethyl chloride whereby there is introduced about 0.3 to 2 pounds of catalyst solvent per pound of polymer produced.

The cold slurry containing about 1 to 20% solids is withdrawn continuously from the reactor through perforated grid 18 and line 15 and is pumped while still cold to a flash drum 28 and falls into a flashing liquid, preferably water, introduced through line 29 which is maintained at about 100–160° F. Vigorous agitation of the flashing liquid is provided by mixer 30 in order to prevent agglomeration of the polymer and to form a uniform water slurry. In view of the low boiling liquids associated with the polymer, these liquids flash off as soon as, if not before, the liquid strikes the water.

Under certain conditions the polymer may form a film around the balls or other pieces of inert material used in the reactor in which case the balls may be removed after discharge of the slurry through the door 20 and the polymer dissolved from the balls by immersing in a suitable solvent, such as "Varsol," mineral spirits, Stoddard solvent or any other petroleum solvent boiling between 300° and 400° F. and having a flash point above 100° F. The resultant solution may then be introduced separately into the flash tank 28.

The gases flashed off from the liquid entrained with the polymer dropped into the flash tank are removed through outlet 31 and passed to a suitable recovery and repurification system 32. The recovery and repurification of the flashed gases removed through line 31 comprises compressing and drying the flashed gases. The resultant mixture is then subjected to fractionation to separate a stream of gaseous solvent which is subject to careful purification, after which it is used to dissolve additional catalyst, whereupon it is reinjected into the reactor through line 14a. The bottoms from the fractionation are subjected to further fractionation to remove overhead iso-olefin and diluent which can be recycled to the reactor and to separate a bottoms fraction containing the diolefins, polymers, etc. which may, if desired, be subjected to a purification in order to separate the polymers and recover the diolefins for recycling to the reactor. The recovered reactants and diluents are cooled to reaction temperature after additional iso-olefin, diolefin and/or diluent are added to make up consumption and losses in the system whereupon these materials may be supplied to the reactor.

The polymer is removed from the flash drum through line 33 in finely divided form as a slurry in hot water. The polymer may be separated from the slurry in any desired manner, a convenient method comprising simply discharging the slurry onto an endless belt type screen, applying suction and passing the polymer through squeeze rolls in order to remove a maximum amount of water mechanically prior to passing the polymer through a tunnel type or other drier. After drying, the polymer is ready for use and may be used directly or packaged for storage or shipment after being put into compact form by extruding, milling, pressing, etc.

In the above paragraphs it has been suggested that a simple mixture containing isobutylene and isoprene as reactants may be used. It is possible, however, to use a considerable number of other mixtures. For instance, the isobutylene may be used alone, or methyl, ethyl ethylene may be reacted with butdiene, isoprene, cyclopentadiene and dimethylbutadiene, as well as various other diolefinic substances. Likewise, other catalysts than aluminum chloride, such as aluminum bromide or zinc chloride or other solid Friedel-Crafts-type catalyst dissolved in a low freezing solvent, such as ethyl or methyl chloride, may be used.

The nature and objects of the present invention having thus been set forth and a specific embodiment of the same given, what is claimed as new and useful and desired to be secured by Letters Patent is:

1. The method of continuously preparing solid polymerization products which comprises continuously introducing reaction mixture containing isobutylene, an inert liquid diluent and a Friedel-Crafts catalyst into a reaction vessel, maintaining the reaction mixture at a temperature below 0° C. thereby forming a slurry of solid polymer particles in reaction liquid, maintaining a large number of lumps of solid inert material within the reaction vessel, continuously rotating the reaction vessel thereby raising said lumps of inert material and causing them to fall through the reaction mixture and to cascade over themselves and over the inner surface of the reaction vessel thereby agitating the reaction mixture and subjecting the solid polymer particles formed to a crushing and attritioning action between the lumps of inert material as well as between the lumps of inert material and the inner walls of the reaction vessel and continuously withdrawing a slurry of solid polymer particles in reaction liquid from the reaction vessel at a point spaced from the point at which the reaction mixture is introduced.

2. The method of continuously preparing solid polymerization products which comprises continuously introducing reaction mixture containing isobutylene and a conjugated diolefin of from 4 to 6 carbon atoms per molecule, an inert liquid diluent and a Friedel-Crafts catalyst into a reaction vessel, maintaining the reaction mixture at a temperature between 0° C. and −160° C. thereby forming a slurry of solid polymer particles in reaction liquid, maintaining a large number of lumps of solid inert material within the reaction vessel, continuously rotating the reaction vessel thereby raising said lumps of inert material and causing them to fall through the reaction mixture and to cascade over themselves and over the inner surface of the reaction vessel thereby agitating the reaction mixture and subjecting the solid polymer particles formed to a crushing and attritioning action between the lumps of inert material as well as between the lumps of inert material and the inner walls of the reaction vessel and continuously withdrawing a slurry of solid polymer particles in reaction liquid from the reaction vessel at a point spaced from the point at which the reaction mixture is introduced.

3. The process as defined in claim 2 wherein the diolefin is butadiene and the diluent is an alkyl halide of from 1 to 2 carbon atoms per molecule.

4. The process as defined in claim 2 wherein the diolefin is isoprene and the diluent is an alkyl halide of from 1 to 2 carbon atoms per molecule.

5. The process as defined in claim 2 in which the diolefin is butadiene, the diluent is methyl chloride and the catalyst is aluminum chloride.

6. The process as defined in claim 2 in which the diolefin is isoprene, the diluent is methyl chloride and the catalyst is aluminum chloride.

FRANK A. HOWARD.

REFERENCES CITED

The following references are of record in the file of this patent:

UNITED STATES PATENTS

| Number | Name | Date |
|---|---|---|
| 1,728,496 | Lindhard | Sept. 17, 1929 |
| 1,827,285 | Ebert | Oct. 13, 1931 |
| 1,862,557 | Wendler | June 14, 1932 |

FOREIGN PATENTS

| Number | Country | Date |
|---|---|---|
| 12,980 | Great Britain | Sept. 11, 1913 |
| 483,453 | Great Britain | Apr. 20, 1938 |